Figures 1, 2:
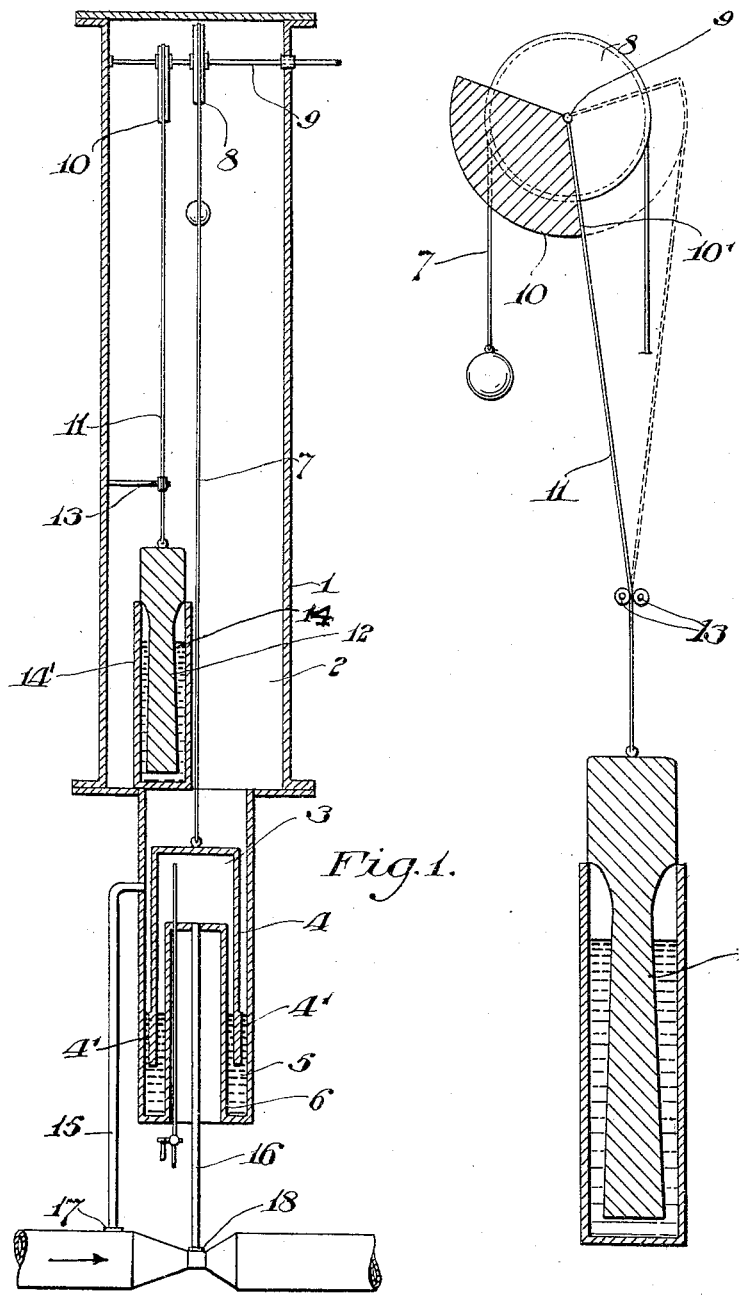

Dec. 27, 1932.   J. W. LEDOUX   1,892,468
METER
Filed Dec. 22, 1928   2 Sheets-Sheet 1

Inventor:
John W. Ledoux,
By [signature]
Attorney.

Dec. 27, 1932.   J. W. LEDOUX   1,892,468
METER
Filed Dec. 22, 1928   2 Sheets-Sheet 2
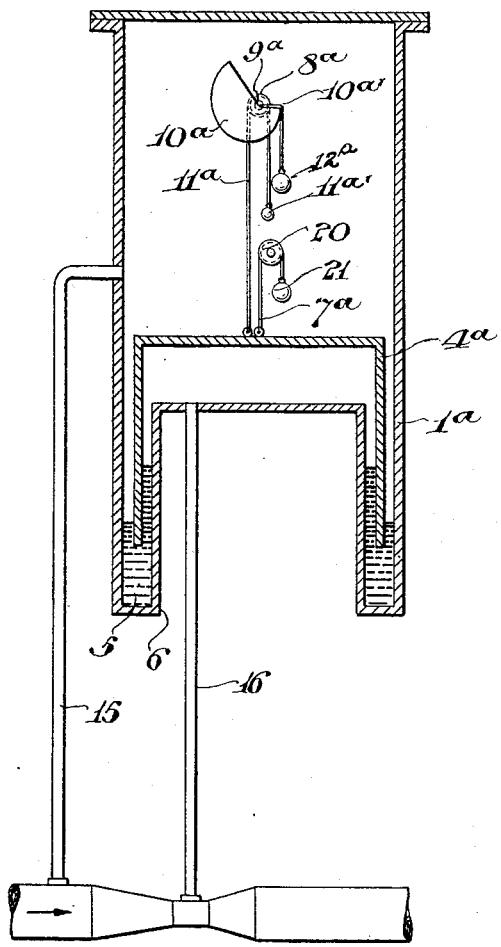
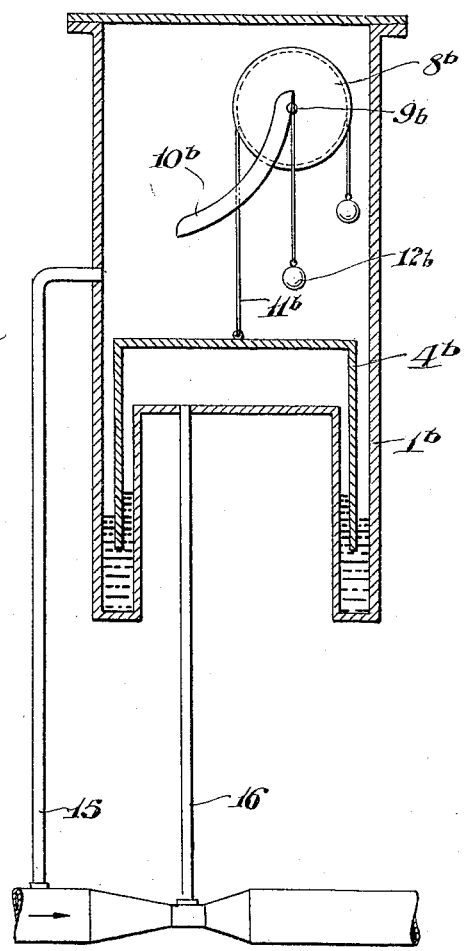
Inventor:
John W. Ledoux,
By
Attorney.

Patented Dec. 27, 1932

1,892,468

UNITED STATES PATENT OFFICE

JOHN W. LEDOUX, OF SWARTHMORE, PENNSYLVANIA

METER

Application filed December 22, 1928. Serial No. 327,850.

My invention is an improved meter for directly measuring flow of a fluid by so modifying the movements of a hollow member having its edges sealed by a liquid seal, and which results from changes in head or differential pressure, as to secure movements of such member directly proportional to changes in velocity or volume. The velocity or volume is an exponential function of change in head or differential pressure of a flowing stream and to compensate for such exponential functional relationship a variable resistance to movement of the sealed member is interposed by varying the leverage of a weight tending to resist such movement. Such variations in leverage is effected by means of a device whereby the weight is moved from a position in which it exerts no force on the sealed member in the datum or "no flow" position.

By my improvements, accurate measurements are attainable since friction and other mechanical impediments to free movement of the hollow member are eliminated or minimized and retardation thereof is effected by the action and by the use of an oscillatory member which moves a weight from a totally inert to a fully effective position, the movements of the weight effected by the oscillatory member being proportioned to the functional relationship of the head or differential pressure to the velocity or volume of flow existing in a conduit or channel or through an orifice of particular type.

My improvements are applicable to the measurement of either liquids or gases flowing through a conduit and differential pressures may be obtained from such fluids by means of a Venturi tube, Pitot tubes, an orifice plate, or other pressure differentiating mechanism. In accordance with my improvements, such differential pressures are communicated respectively to chambers formed in a casing by a hollow member, such as a hood or bell having free edges sealed by a liquid heavier than that to be measured and contained in the casing. The movements of the hood by the differential pressures are resisted by a weight connected with the hood by a tension member which in the datum or "no flow" position is coincident with a radius projecting from an axis about which the tension member is wound upon a segment as the flow increases. The segment is moved about its axis by the movements of the hood and carries the tension member away from the radial line, thereby increasing the leverage of the weight.

Preferably the tension member occupies positions at angles to the vertical in both its datum and full flow positions and passes through the vertical during the movement of the cam from one of its extreme positions to the other.

The movements of the hood are by my improvements made directly proportioned to the volume or velocity of the fluid being measured and such movements may be transmitted to usual forms of indicating, registering and recording instruments such, for instance, as are illustrated in my Patents Nos. 1,064,748 and 1,129,209.

The characteristic features and advantages of my improvements will further appear from the following description and the accompanying drawings of illustrative embodiments of my invention:

In the drawings, Fig. 1 is a diagrammatic vertical sectional view of a form of apparatus embodying my invention; Fig. 2 is an enlarged view of detached parts of Fig. 1 positioned at right angles to Fig. 1; Fig. 3 is a diagrammatic vertical sectional view of a modified form thereof and Fig. 4 is a diagrammatic vertical sectional view of a second modified form.

As illustrated in Figs. 1 and 2, a closed cylindrical casing 1 is divided into a plurality of non-communicating chambers 2 and 3 by a hollow member 4, such as a hood or bell having free edges sealed by mercury 5 contained in a channel 6 of the casing 1. The hood preferably has sufficient buoyancy to float in the mercury and, if necessary, the flange 4' may be thickened to provide increased buoyancy and/or may be balanced by a counterweight. The top of the hood is connected by a tension member 7 with the periphery of a circular sheave 8 fixed on the shaft 9. The shaft is journalled in and projects through the casing 1 and may be connected with usual forms of indicating, registering and recording mechanisms such as those shown in my Patents Nos. 1,064,748 and 1,129,209.

The shaft 9 also has fixed thereon a peripherally grooved segment 10. A tension member 11 is fixed to the member 10, passes between pulleys 13 and supports the vertically reciprocable weight 12.

To secure increased accuracy, the weight may be properly shaped and immersed in mercury or other heavy liquid 14 in the receptacle 14'. The required shape is computed mathematically and is proportioned to the functional relation between the head or differential pressure and the velocity of the stream to be measured.

The chambers 2 and 3 formed in the casing 1 within and without the hood 4 communicate through the pipes 15 and 16 with zones of different pressures such as are caused by the flow of a fluid to be measured through a conduit containing a Venturi tube or other pressure differentiating means. The pipe 15 is connected with a normal section 17 of the conduit and the pipe 16 is connected with the contracted throat 18.

When there is no flow in the conduit, the pressures communicated to the chambers 2 and 3 of the casing 1 through the pipes 15 and 16 are equal and the hood 4 stands in its uppermost position and the weight 12 in its lowermost position. As the flow in the conduit increases from zero to the maximum, the pressure communicated through the pipe 16 decreases much more rapidly than that communicated through the pipe 15, the velocity of the flowing fluid being proportional to the square root of the difference in pressures.

The difference in pressures in the chambers causes the hood 4 to descend thereby elevating the weight or displacing device 12 which is exteriorly so shaped as to interpose a varying resistance to the descent of the hood.

When the weight 12 is in its lowermost position, the tension member 11 is taut and coincident or in alignment with the edge 10' of the cam which is cut on a radius of the axis of the shaft 9 consequently there is no torque upon the shaft 9 by the weight in the "no flow" position when the hood is in its highest position. When, however, the hood 3 moves downward, it pulls on the tension member 7 to rotate the sheave 8, shaft 9 and sheave segment 10.

The movement of the member 10 carries the cord 11 away from its radial position and consequently the weight 12 imparts a torque resistance to the turning of the shaft 9. This resistance is proportioned to the functional relation between the velocity and differential pressures of the flowing stream by mathematical calculation of the proper radius and rate of movement for the member 10 to increase the leverage of the weight at the requisite varying rate during passage of the cord 11 from the full line to the dotted line position shown in Fig. 2. The pulleys 13 cause the pull on the weight to be in a vertical direction so as to avoid friction between the weight and its container. The movements of the cord from "no flow" to vertical position and from vertical to "full flow" position are preferably approximately equal.

The movements of the shaft 9 are thus directly proportioned to changes in volume or velocity of the flowing fluid and may be transmitted to usual forms of indicating, registering and recording instruments as above set forth.

In the form of the invention illustrated in Fig. 3, the movements of the hood 4a as a result of the differential pressures communicated thereto through the pipes 15 and 16 are controlled so as to be in direct proportion to the velocity or volume of flow in the conduit by means of a weight 12a depending on the cord 10a' from the cam or segmental sheave 10a. The cord 10a' is so connected with the member 10a that when the hood is in its highest or "no flow" position the cord 10a' is on or in alignment with a radius projected perpendicularly downward from the axis of the shaft 9a about which the member 10a rotates.

The periphery of the member 10a has the form of a curve proportioned to the functional relation between the velocity and differential pressures of the fluid being measured and serves the purpose of the shaped contour of the weight 12 in the form shown in Fig. 1.

The movement of the hood 4a is transmitted to the member 10a through a tension member 11a, sheave 8a and shaft 9a; the tension member being held taut by a light weight 11a'.

The normal weight of the hood 4a is supported by the mercury 5 or may be partly counterbalanced by a counterweight 21 depending from a tension member 7a passing over a sheave 20. It will be understood that when the differential pressure of the fluid flowing in the conduit causes the descent of the hood 4a, the member 10a is turned through the parts described so that the tension member 11a is moved from its position perpendicularly beneath the axis of the shaft 9a and the weight 12a exercises a torque or turning movement on the shaft 9a resisting the descent of the hood 4a in proportion to the increasing leverage which the weight 12a has as a result of the movement of the member 10a. The amount of leverage is further modified by the spiral contour of the edge of the member 10a, and the movement of the shaft 9a is consequently in direct proportion to changes in the volume or velocity of flow, which may be measured or indicated by the transmission of the movement of the shaft 9a to any suitable mechanism.

In the form of the invention shown in Fig. 4, the cam 10b has the shape of a curved arm projecting from the shaft 9b and controls the leverage of the weight 12b and consequently its retarding effect upon the shaft 9b in proportion to the movement communicated thereto from the hood 4b.

The weight 12b depends from the arm 10b in a line coincident with a radius extending perpendicularly downward from the shaft 9b when the hood 4b is in its highest position. As the hood 4b descends as a result of the communication of the differential pressures to the casing 1b, the arm 10b moves the weight 12b outwardly so that its leverage applies a torque resisting the pull imparted to the shaft 9b by the hood 4b, such resistance being proportioned by the shape of the arm's edge to the functional relation between the differential pressures and velocity of flow in the conduit. Consequently the movement of the shaft 9b is in direct proportion to the velocity or volume of flow in the conduit and such movement may be communicated to any suitable mechanism.

Having described my invention, I claim:

1. Apparatus of the character described comprising a casing, a hollow device having a submerged open end and movable in said casing, said casing containing a liquid sealing said hollow device, means for communicating differential pressures to said casing within and without said device, a shaped weight, a tension member connecting said weight with said hollow device, a container, a liquid in said container in which said weight is immersed, said weight being so shaped that its varying displacement in its immersing liquid interposes a varying resistance to the movement of said hollow device, and means for increasing the leverage of said weight as said hollow device moves from its datum or no-flow position.

2. Apparatus of the character described comprising a casing, a hollow device having a submerged open end and movable in said casing, said casing containing a liquid sealing said hollow device, means for communicating differential pressure from a flowing fluid to said casing within and without said hollow device, a weight, a tension member connected with said weight and with said device and tending to resist movement thereof, and a rotatable member increasing the leverage of said weight as said hollow device moves from its datum or no-flow position, said tension member having a section thereof disposed at an angle to the vertical in both the datum and full flow positions of said hollow device.

3. Apparatus of the character described comprising a casing, a hollow device having a submerged open end and movable in said casing, said casing containing a liquid sealing said hollow device, means for communicating differential pressure from a flowing fluid to said casing within and without said hollow device, a shaped weight, a tension member connecting said weight with said device and tending to resist movement thereof, a container, a liquid in said container and in which said weight is variably displaced with the movement of said hollow device, the variations in the displacement of said weight interposing a varying resistance upon the movement of said hollow device, a rotatable member from which said weight depends in a line coincident with a radius of said member when said hollow member is at one of the limits of its movements to avoid torque on said member, said member moving said weight from said position upon the movement of said hollow member.

4. Apparatus of the character described comprising a casing, a hollow device having a submerged open end and movable in said casing, said casing containing a liquid sealing said hollow device, means for communicating differential pressure from a flowing fluid to said casing within and without said hollow device, a weight, a tension member connecting said weight with said device and tending to resist movement thereof, means for varying the leverage of said weight with the movement of said hollow member, a container having therein a liquid heavier than that to be measured, said weight being variably immersed in said last named liquid and producing varying resistance by its displacement.

5. Apparatus of the character described comprising a hollow member, having a submerged open end and means containing a liquid sealing said hollow member, means for communicating differential pressures from a flowing stream to opposite sides of said hollow member, mechanism turned by said hollow device, a weight and a member connecting said mechanism and weight, the pull of said weight on said mechanism when the hollow member is in its datum or no-flow position being along a line coincident with a radius from the axis of turning of said mechanism in the datum position thereof to avoid torque on said mechanism and said member having a section thereof disposed at an angle to the vertical in both the datum and full flow position of said hollow device and passing through the vertical during the movement of said hollow device from its datum to full flow position.

6. Apparatus of the character described comprising a casing, a hollow device having a submerged open end and movable in said casing, a liquid sealing said hollow device, a container for said sealing liquid, means for communicating differential pressures from a flowing fluid to said casing within and without said hollow device, a weight, a tension member connecting said weight with said device for controlling the movement thereof, means for varying the leverage of said weight with the movement of said hollow member, the said weight being variably immersed in a liquid heavier than that to be measured and producing varying resistance by its displacement in said liquid, and a container for said liquid last named.

In testimony whereof I have hereunto set my name this 18th day of December 1928.

JOHN W. LEDOUX.